US007011774B2

(12) United States Patent
Risch

(10) Patent No.: US 7,011,774 B2
(45) Date of Patent: Mar. 14, 2006

(54) COMPOSITE STRUCTURAL COMPONENTS CONTAINING THERMOTROPIC LIQUID CRYSTALLINE POLYMER REINFORCEMENTS FOR OPTICAL FIBER CABLES

(75) Inventor: Brian G. Risch, Hickory, NC (US)

(73) Assignee: Draka Comteq BV, Amsterdam (NL)

(*) Notice: Subject to any disclaimer, the term of this patent is extended or adjusted under 35 U.S.C. 154(b) by 288 days.

(21) Appl. No.: 10/105,925

(22) Filed: Mar. 25, 2002

(65) Prior Publication Data

US 2002/0146563 A1 Oct. 10, 2002

Related U.S. Application Data

(62) Division of application No. 09/027,693, filed on Feb. 23, 1998, now abandoned.

(51) Int. Cl.
*B29D 11/00* (2006.01)
(52) U.S. Cl. ............... 264/1.28; 264/1.29; 264/1.6
(58) Field of Classification Search ............ 264/1.28, 264/1.29, 1.6, 1.7
See application file for complete search history.

(56) References Cited

U.S. PATENT DOCUMENTS

| 4,728,698 | A | * | 3/1988 | Isayev et al. ............... 525/439 |
| 4,735,858 | A | * | 4/1988 | Hosokawa et al. ......... 428/390 |
| 4,772,089 | A | | 9/1988 | Ide et al. |
| 4,793,685 | A | | 12/1988 | Taylor et al. |
| 4,906,066 | A | * | 3/1990 | Ryan ......................... 385/107 |
| 4,910,057 | A | | 3/1990 | Ide et al. |
| 4,923,278 | A | | 5/1990 | Kashyap et al. |
| 4,966,807 | A | | 10/1990 | Harvey et al. |
| 5,002,358 | A | * | 3/1991 | Beresford .................. 385/113 |
| 5,032,433 | A | | 7/1991 | Isayev et al. |
| 5,098,177 | A | | 3/1992 | Tanaka |
| 5,225,488 | A | | 7/1993 | Baird et al. |
| 5,275,877 | A | | 1/1994 | Isayev |
| 5,561,729 | A | | 10/1996 | Parris |
| 5,574,816 | A | | 11/1996 | Yang et al. |
| 5,834,560 | A | | 11/1998 | Baird et al. |
| 5,911,023 | A | | 6/1999 | Risch et al. |
| 6,077,907 | A | | 6/2000 | Raetzsch et al. |

FOREIGN PATENT DOCUMENTS

| EP | 0422218 | | 4/1991 |
| FR | 2608287 | * | 6/1988 |
| WO | WO9218568 | | 10/1992 |
| WO | WO9324574 | | 12/1993 |

OTHER PUBLICATIONS

*The Role of Crystallization Kinetics in the Development of the Structure and Properties of Polypropylene Filaments* by F.M. Lu & J.E. Spruiell, 1993.
*Influence of Molecular Weight Distribution on the Structure and Properties of Melt-Spun Polypropylene Filaments* by S. Misra, F.M. Lu, J. Spruiell & G.C. Richeson, 1995.

(Continued)

*Primary Examiner*—Mathieu D. Vargot
(74) *Attorney, Agent, or Firm*—Ware, Fressola, Van der Sluys & Adolphson LLP

(57) ABSTRACT

A process for producing an optical fiber cable composite structural component, such as reinforcing members, buffer tubes, filler rods, jackets, and slotted cores, is disclosed. The composite structural components are produced by co-extruding a thermotropic liquid crystalline polymer (TLCP) and a thermoplastic matrix material into the composite structural component so that TLCP reinforcing fibrils are dispersed in the thermoplastic matrix material. The TLCP reinforcing fibrils undergo a high level of process induced orientation, are provided with a high aspect ratio, and small diameters. The composite structural component has a high modulus. The TLCP reinforcing fibrils may be made continuous or discontinuous.

4 Claims, 6 Drawing Sheets

OTHER PUBLICATIONS

*The Fibrillar Structure of Melt Spun and Drawn PP Filaments* by H. Bodaghi, J.E. Spruiell and J.L. White, 1988.
*The Influence of Resin Characteristics on the High Speed Melt Spinning of Isotactic Polypropylene: I. Effect of Molecular Weight and Its Distribution on Structure and Mechanical Properties of As-Spun Filaments and II. On-Line Studies of Diameter, Birefringence, and Temperature Profiles* by F.M. Lu & J.E. Spruiell, 1987.
*Rotating Die Paves Way for LCP's Benefits in Tubing* by Bernie Miller, from *Technology News*, Jul., 1996.

* cited by examiner

COMPOSITE STRUCTURAL COMPONENTS CONTAINING THERMOTROPIC LIQUID CRYSTALLINE POLYMER REINFORCEMENTS FOR OPTICAL FIBER CABLES

CROSS REFERENCE TO RELATED APPLICATIONS

This application is a divisional application of Ser. No. 09/027,693 filed on Feb. 23, 1998, now abandoned.

BACKGROUND OF THE INVENTION

1. Field of the Invention

The present invention relates to optical fiber cables and structural members for optical fiber cables. More particularly, this invention relates to optical fiber cable structural members formed from composite materials containing thermotropic liquid crystalline polymer reinforcements which are formed in-situ with a matrix.

2. Description of the Prior Art

Optical fiber cables have been in use in the communications industry for a number of years to transmit information at very high rates over long distances. In an optical fiber cable the information is carried in the form of light signals through glass fibers with diameters on the order of 100 $\mu$m. These fibers are protected from the environment and external stresses by cable structures in which they are housed.

In designing optical fiber cable structures, it is important to ensure that stresses associated with cable installation and operational environment do not interfere with optical fiber performance. Generally, reinforcing materials are incorporated into cable structure designs in order to prevent the fibers from becoming strained by installation stresses or by mechanical or thermal stresses experienced during operation. Typical reinforcing materials utilized in cables have a high modulus and a low coefficient of thermal expansion (CTE). Reinforcing materials of choice have included steel, glass fibers or yarns, glass reinforced composites, polyester yarns, and aramid fibers or yarns. Aramid fibers or yarns are commonly used as reinforcing materials because they offer the best combination of mechanical properties and weight, but these materials are also characterized by a high cost. Aramid fibers and yarns are produced using polymers which are classified as liquid crystalline polymers (LCP). Liquid crystalline polymers are characterized by the ease in which molecular orientation occurs during melt or solution processing, resulting in the ability to obtain good mechanical properties in the process or machine direction. However, due to very high melting points of the polymeric materials used, conventional melt processing of aramid LCPs is not possible. Special processing equipment and technology must be used to produce aramid yarns containing LCP. This special processing equipment cannot be practically incorporated into an optical fiber cable manufacturing process. As a result, aramid yarns are produced separately and then incorporated into a cable structure as part of an additional manufacturing step. The addition of components or processing steps adds to the manufacturing costs and to the complexity of the production procedure.

SUMMARY OF THE INVENTION

It is an object of the present invention to provide an optical fiber cable structural component made from a composite material containing thermotropic liquid crystalline polymer reinforcements.

It is another object of the present invention to provide a method for making a thermoplastic optical fiber cable structural component having highly oriented, high modulus thermotropic liquid crystalline polymer materials incorporated therein.

It is still another object of the present invention to provide a method for making a thermoplastic polymer based optical fiber cable component with good strength, a low coefficient of thermal expansion, and good processability.

These objects are accomplished, at least in part, by co-extruding at least one conventional thermoplastic polymer and at least one thermotropic liquid crystalline polymer to a structural component for an optical fiber cable having thermoplastic matrix with a thermotropic liquid crystalline polymer (TLCP) fibrils dispersed therein, wherein the fibrils have a diameter of up to about 100 $\mu$m and a length to diameter ratio (aspect ratio) of at least 10.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE PRESENT INVENTION

Figure 1:
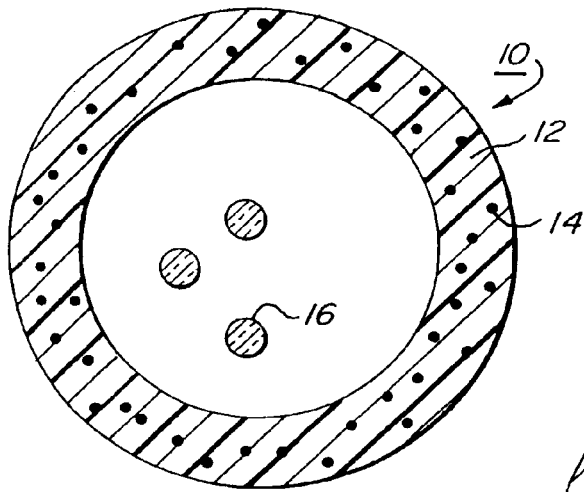
FIG. 1, which is a cross-sectional diagram illustrating an optical fiber cable buffer tube formed from a composite material containing thermotropic liquid crystalline reinforcement fibrils which are formed in-situ.
Figure 2:
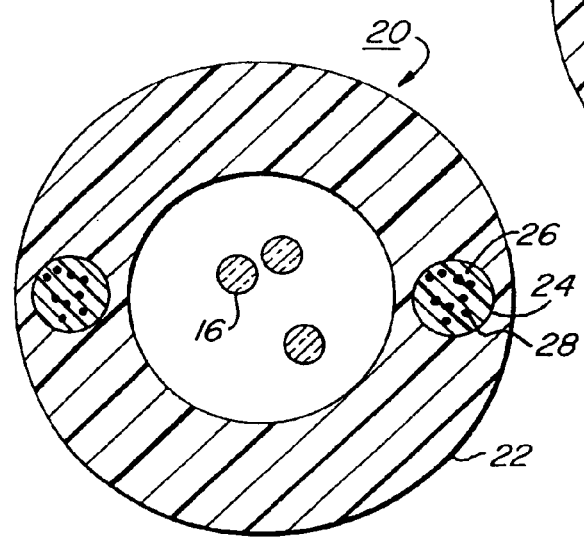
FIG. 2, which is a cross-sectional diagram illustrating an optical fiber cable having reinforcing members formed from a composite material containing thermotropic liquid crystalline reinforcement fibrils which are formed in-situ with the matrix.
Figure 3:
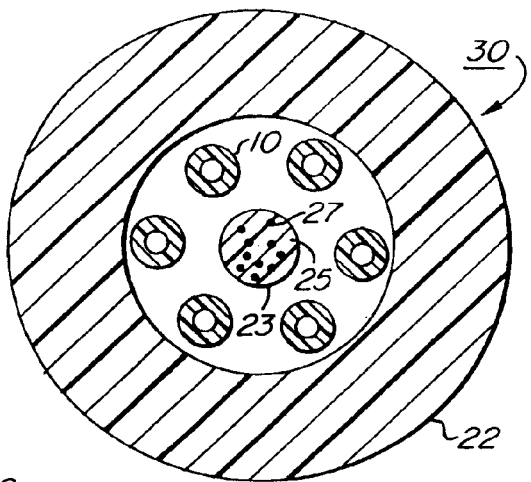
FIG. 3, which is a cross-sectional diagram of a reinforced jacket containing optical fibers, the reinforcement members being formed from the thermoplastic matrix with thermoplastic liquid crystalline fibrils therein.
Figure 4:
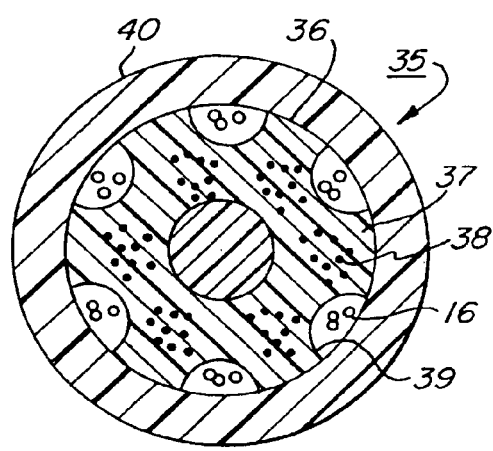
FIG. 4, which is a cross-sectional diagram of a reinforced slotted core type optical fiber cable, the slotted core being formed from the thermoplastic matrix with the thermoplastic liquid crystalline fibrils therein.

FIG. 1 illustrates a typical optical fiber cable buffer tube for an optical fiber cable of the loose tube variety. According to the present invention, the buffer tube 10 illustrated in FIG. 1 is formed from a composite material comprising a thermoplastic matrix material 12 having thermotropic liquid crystalline polymer (TLCP) reinforcement fibrils 14 incorporated therein. The buffer tube 10 houses optical fibers 16. FIG. 2 illustrates a cable structural member, like a buffer tube, comprising a jacket 22 having rod-like reinforcement members 24 incorporated therein. The reinforcement members 24 are formed from a thermoplastic matrix material 26 containing TLCP reinforcement fibrils 28. FIG. 3 illustrates a stranded optical fiber cable 30 having a plurality of buffer tubes 10 housing optical fibers (not shown) contained within an outer jacket 22. A strength member 23 is also contained within the outer jacket 22. The strength member is formed from a thermoplastic matrix 25 having TLCP fibrils 27 dispersed therein. The buffer tubes 10 may also be formed as described above and illustrated in FIG. 1. FIG. 4 illustrates a slotted core type optical fiber cable 35. The core 36 is formed from the thermoplastic matrix 37 having TLCP fibrils 38 dispersed therein. A plurality of slots 39 hold optical fibers 16. An outer jacket 40 is provided over the slotted core 36. Those skilled in the art will now appreciate that cable structural components, such as the buffer tube 10, the reinforcement member 24, filler rods 23, part or all of the outer jacket 22, or the slotted core 36 may be formed with the composite material which is further described using the process described below.

Figure 5:
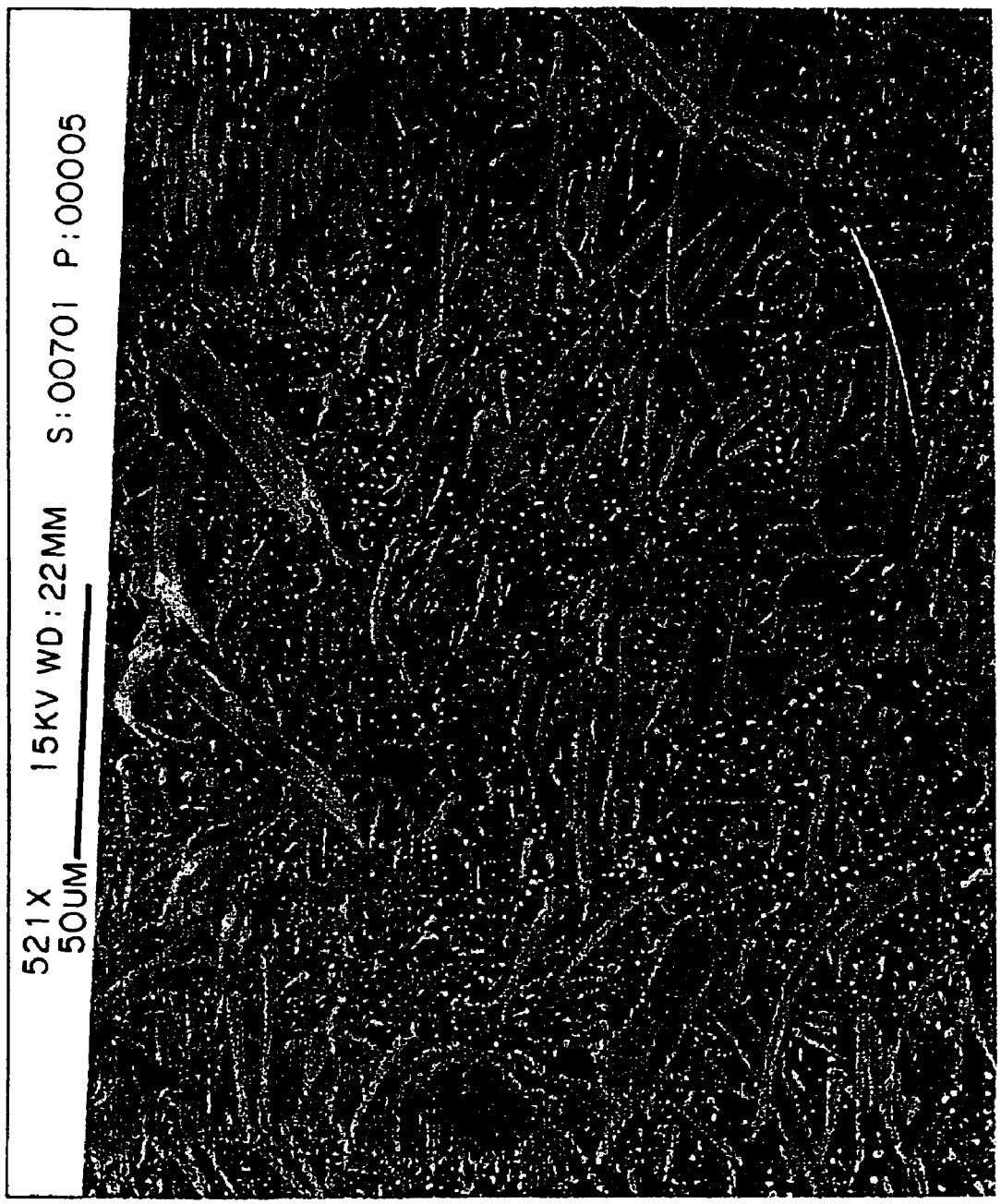
FIG. 5, which is an electron micrograph illustrating the phase morphology of a TLCP reinforcement and LCP fibrils having diameters below about 10 $\mu$m.

According to the present invention, TLCP fibrils, such as 14 (FIG. 1), 28 (FIG. 2), 27 (FIG. 3) or 38 (FIG. 4) are formed in-situ with the formation of the thermoplastic matrix, such as 12 (FIG. 1), 26 (FIG. 2), 25 (FIG. 3) or 37 (FIG. 4) by a co-extrusion process. The co-extrusion process yields TLCP reinforcing fibrils in the thermoplastic matrix which are long, have a high aspect ratio (length to diameter ratio of about 10 and are highly oriented in the axial direction. As illustrated in FIG. 5, the TLCP fibrils are microscopic in diameter (about 100 μm or less), and preferentially have a diameter on the order of about 10 μm or less. The fibrils contained within the thermoplastic matrix forming the structural component, such as a buffer tube 10, reinforcing member 24, filler rod 23 or jacket 22, are preferentially oriented so that they lay primarily in the processing direction, also known as the longitudinal or axial direction, to give a structural cable component formed therefrom an increase in mechanical properties which are large in magnitude in the longitudinal direction and small in magnitude in the transverse direction. Such orientation enables the structural component of the cable to have a significant tensile strength in the longitudinal direction with a minimum sacrifice in terms of flexibility due to the increase in extensional flow which occurs while passing the TLCP materials through a mixing apparatus as will be further described below. An increase in modulus and decrease in the coefficient of thermal expansion is seen relative to the neat TLCP polymer. Additionally, the TLCP fibrils oriented to lay in the processing, longitudinal or axial direction within the thermoplastic matrix causes a substantial decrease in the coefficient of thermal expansion (CTE) in the longitudinal direction of the structural cable component formed therefrom.

Figure 6A:
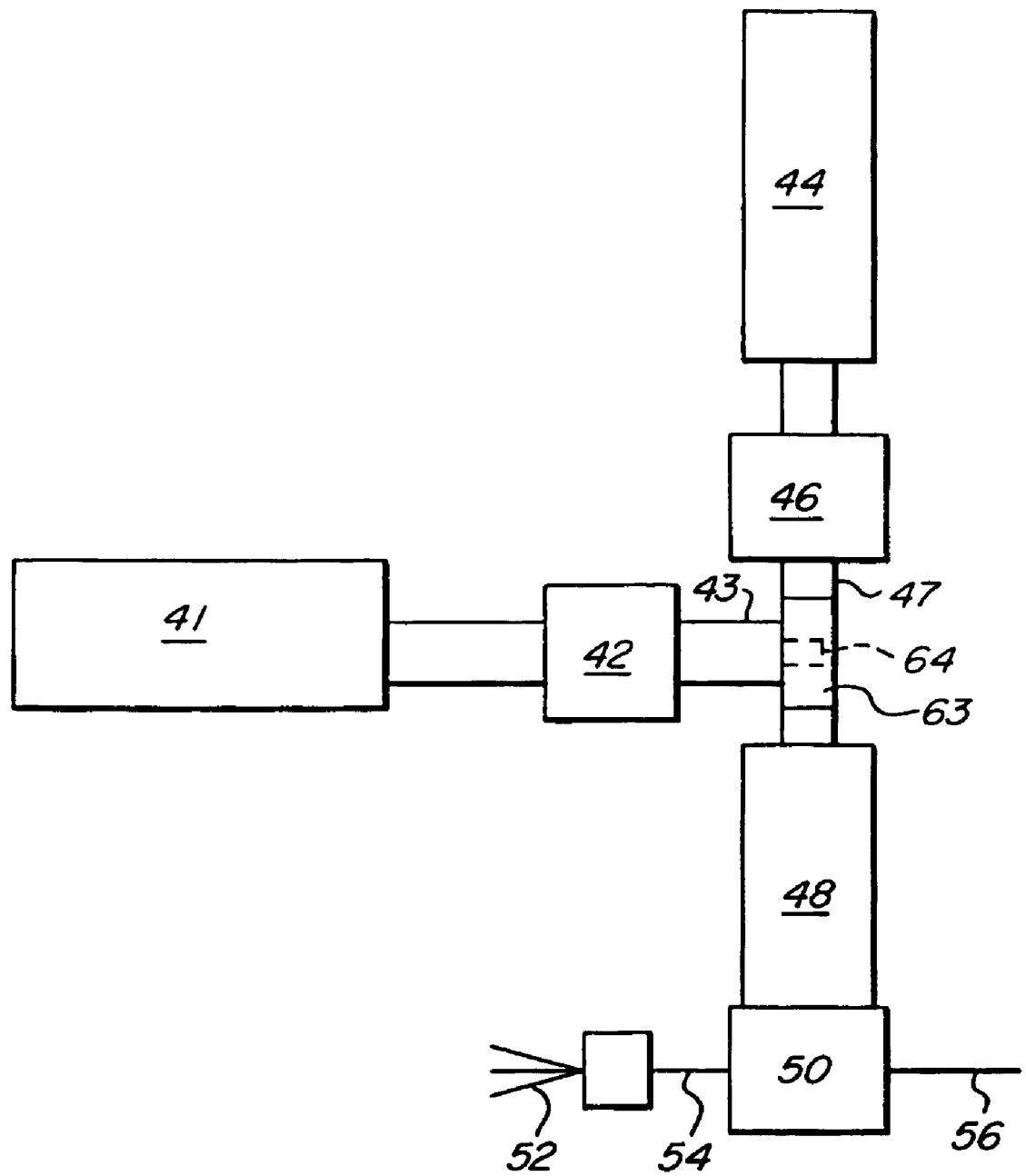
FIG. 6A, which is a schematic diagram of a dual extrusion process which may be used to produce composite optical fiber cable structural components containing thermotropic liquid crystalline reinforcements.
Figure 6B:
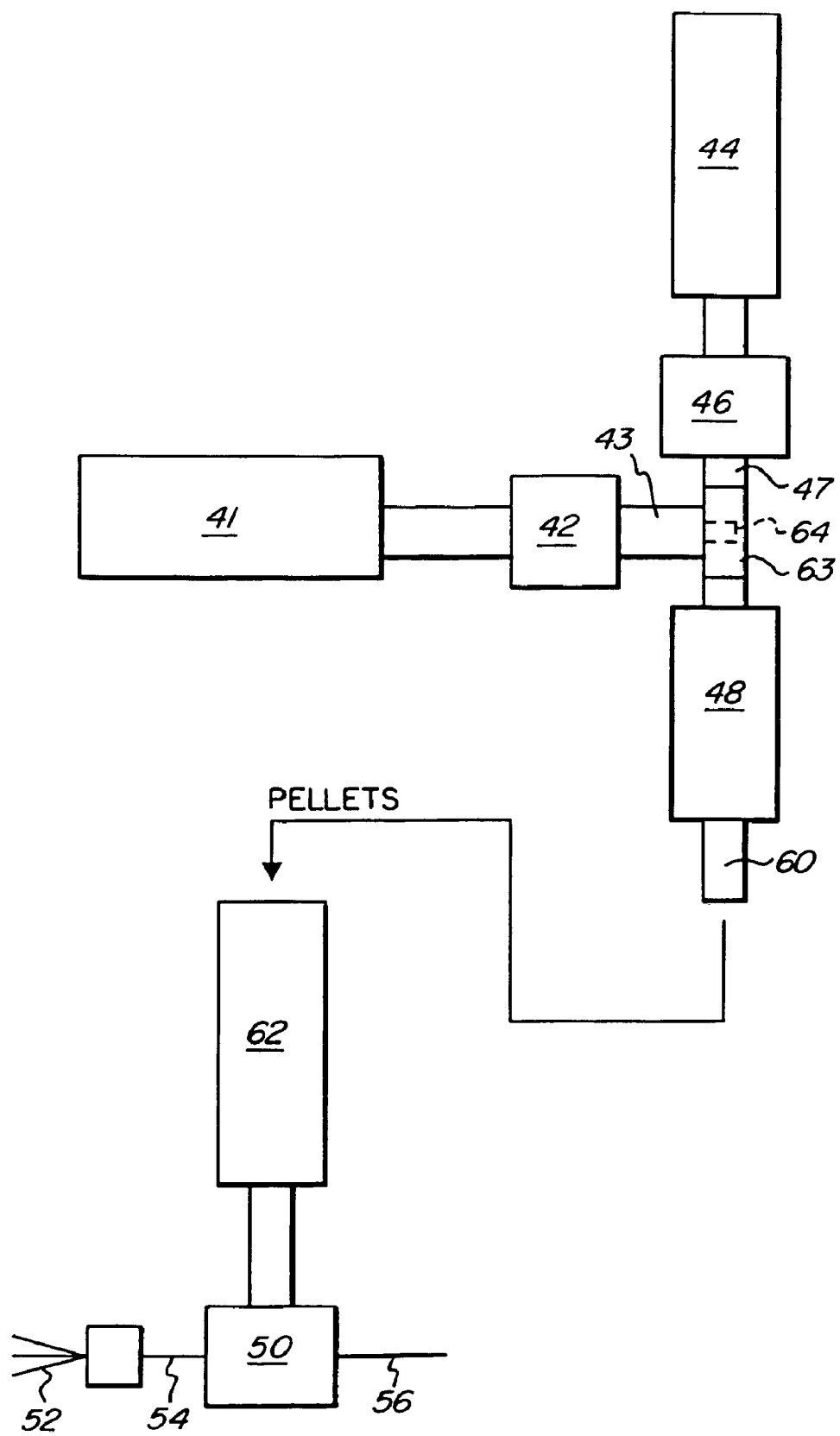
FIG. 6B, which is a schematic diagram of a two-step extrusion process wherein the thermotropic liquid crystalline polymers are pelletized and then incorporated into the melt stream of a thermoplastic matrix material.
Figure 6D:
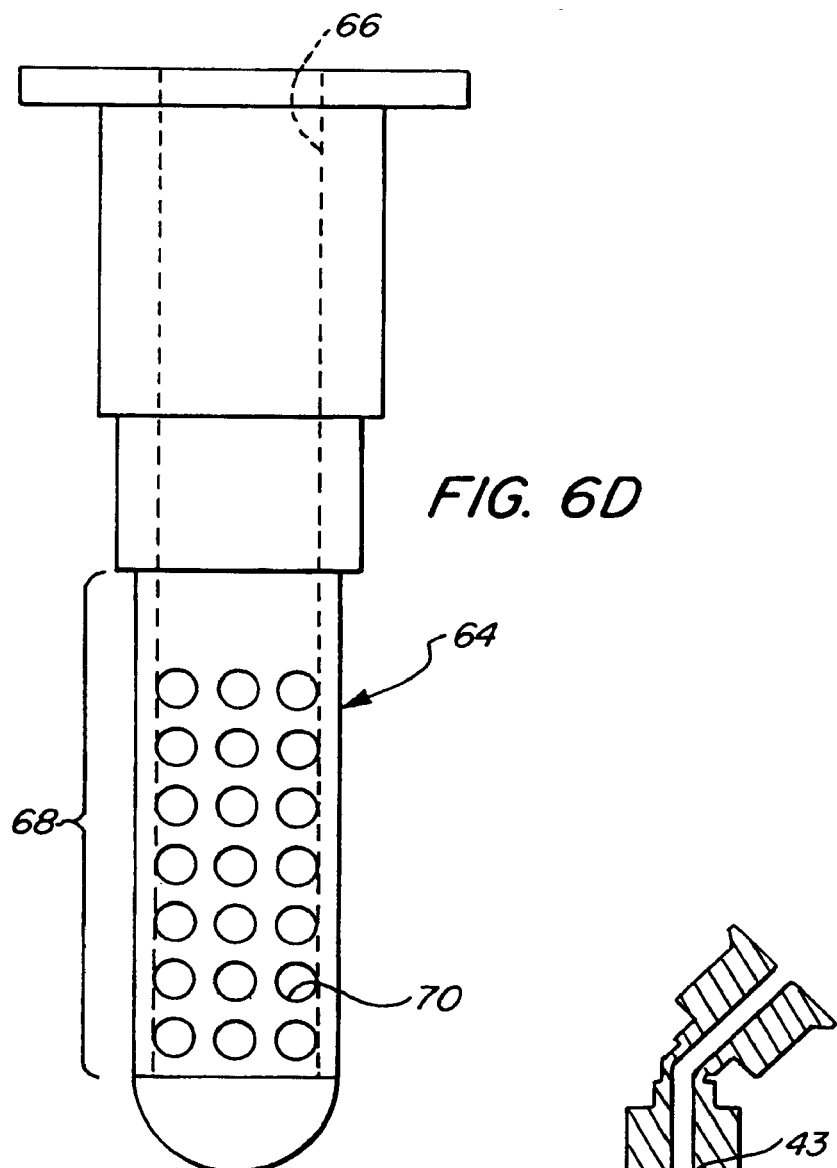
FIG. 6D, which is a plan view of the injector.
Figure 6C:
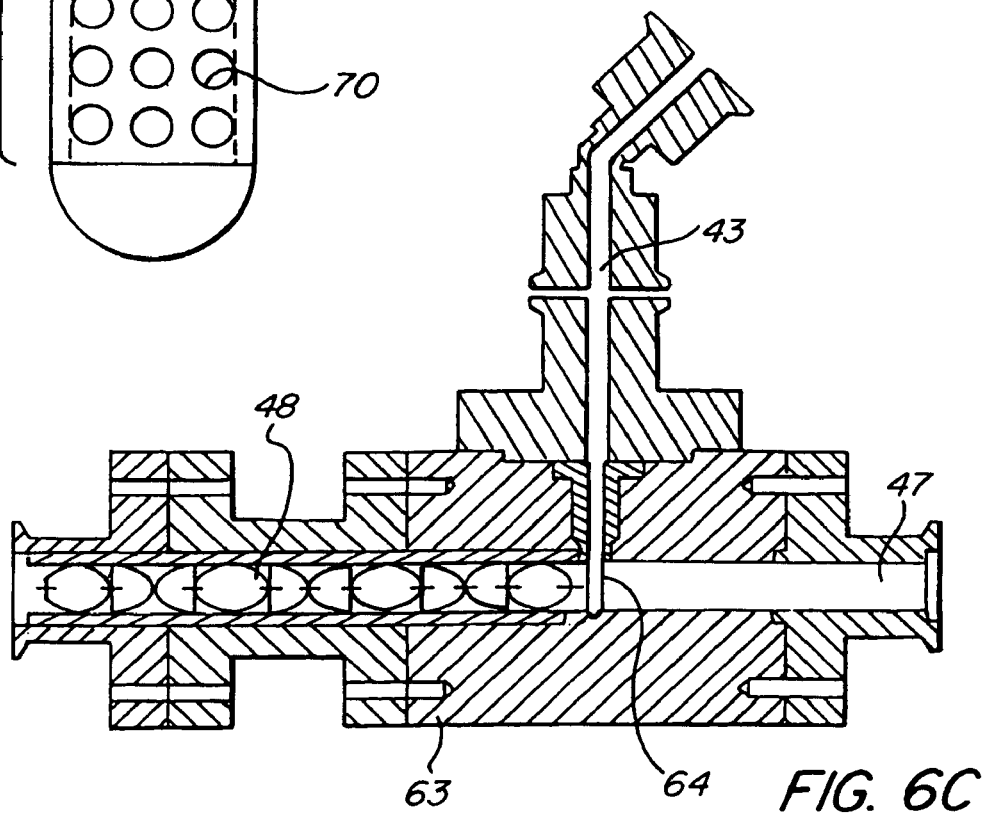
FIG. 6C, which is a cross-sectional view of the injection apparatus for providing a plurality of thermoplastic liquid crystalline melt streams within the thermoplastic matrix melt.

According to the present invention, the structural cable component formed from the composite material comprising a thermoplastic matrix having TLCP fibrils therein may be produced using either a one or two step process. Referring to FIG. 6A, which illustrates a single-step process, TLCP is extruded by extruder 41 and injected, by way of gear pump 42 and injection apparatus 43 into the melt stream of the thermoplastic matrix, which may be a polymer blend, a homogeneous thermoplastic melt, or a multi-layer structure, which is extruded by extruder 44 into gear pump 46. Under this arrangement, the TLCP is injected into the thermoplastic matrix material as one or more polymer melt streams. A compatibilizer, such as a graft copolymer of polypropylene or polyethylene and maleic anhydride may be added to promote adhesion between the TLCP phase and the thermoplastic matrix. Preferentially, the TLCP is injected as a plurality of melt streams through a specially designed injection head 64, which is positioned within injection body 63 (FIGS. 6C and 6D). Referring to FIGS. 6C and 6D, the thermoplastic matrix melt stream is introduced into the injection body through inlet 47 and the TLCP melt stream is introduced into the injection body 63 through TLCP inlet 43. The injection head 64 is located at the end of the TLCP inlet 43. The injection head 64 is a tube having an interior passage 66 and a finger portion 68 which is positioned within the injection body 63 so as to be exposed to the thermoplastic matrix melt stream. The finger portion has a plurality of apertures 70. According to the present invention, the TLCP melt is extruded through passage 66 into the finger portion 68, wherein the TLCP melt is injected as a plurality of melt streams into the thermoplastic matrix through the apertures 70 in the finger portion to form a composite melt. After the TLCP streams are injected into the thermoplastic matrix melt, the composite melt passes through one or more mixing devices 48, such as static mixers, which divide the initial TLCP streams in the composite melt into additional TLCP streams. Typically, static mixers are preferred as the mixing devices because these devices can divide the streams of TLCP and recombine the flow in the composite melt without disrupting the continuity of the TLCP phase in the composite melt. As the TLCP melt streams in the composite melt are subdivided and drawn down, they experience extensional flow. This extensional flow results in TLCP fibrils in the thermoplastic matrix that lay primarily in the longitudinal direction. This substantially longitudinal molecular orientation of the TLCP causes a substantial increase in modulus in the composite melt product. After the composite melt has passed through enough mixing devices to divide the flow pattern into well dispersed TLCP fibrillar structures of microscopic diameter up to about 100 μm, the composite melt can be passed directly through a crosshead 50 which surrounds optical fibers 52 covered with a filling gel 54 with a structure, such as a buffer tube 56, made from the composite material as shown in FIG. 6A. Alternatively, the resulting composite melt can be passed through a profile die to produce a fiber optic cable component directly for later incorporation into an optical fiber cable. Referring to FIG. 6B, the composite melt can be passed through a die and pelletized with a pelletizer 60 and extruded by extruder 62 into the crosshead 50 to form a cable component. Direct processing of the composite melt containing the TLCP, as illustrated in FIG. 6A, results in substantially continuous reinforcing TLCP fibrils filaments in the thermoplastic matrix, while pelletization and reprocessing, as illustrated in FIG. 6B, results in substantially discontinuous TLCP fibrils dispersed in the thermoplastic matrix.

Figure 7:
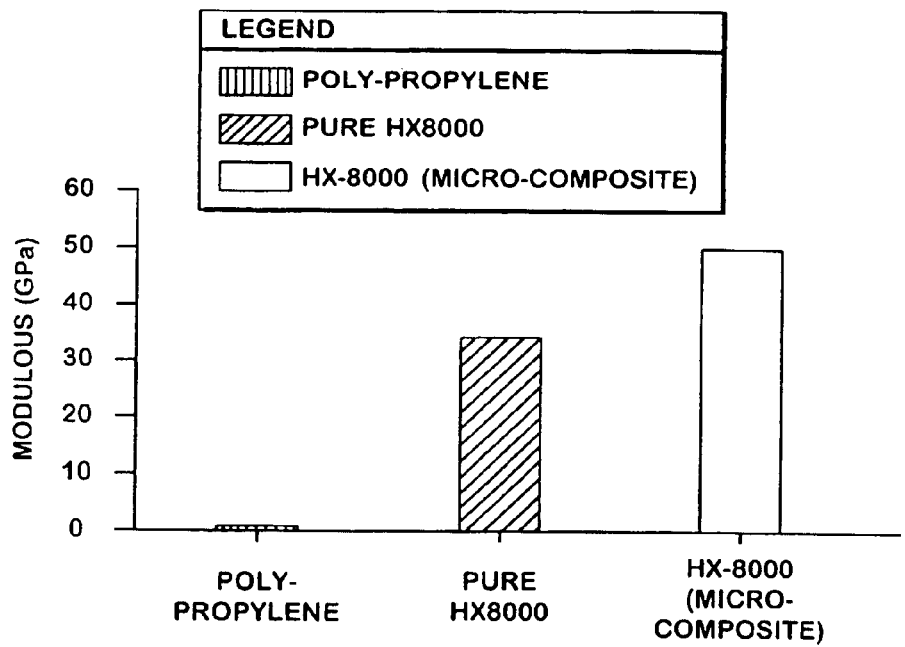
FIG. 7, which is a graphical illustration comparing the tensile modulus of neat nucleated impact polypropylene copolymer, neat thermotropic liquid crystalline polymers, and the thermotropic liquid crystalline polymer phase in a composite material produced using a drawdown ratio of 20:1.

A comparison of the tensile modulus of neat nucleated impact polypropylene copolymer, neat thermotropic liquid crystalline polymer, such as HX-8000 made by DuPont and a composite material comprising nucleated impact polypropylene copolymer having a TLCP material, such as HX-8000, incorporated therein using a drawdown ratio of 20 to 1 is illustrated in FIG. 7. As shown in this figure, the extensional flow of the TLCP phase in the thermoplastic matrix caused by the injection of multiple TLCP melt streams, the subsequent static mixing thereof and the 20 to 1 drawdown results in a substantial enhancement of the tensile modulus in the resulting composite material. The control of phase morphology during processing using the methods of the present invention leads to about a 20 percent increase in the modulus of the TLCP phase in the composite material over that of neat TLCP.

Figure 8:
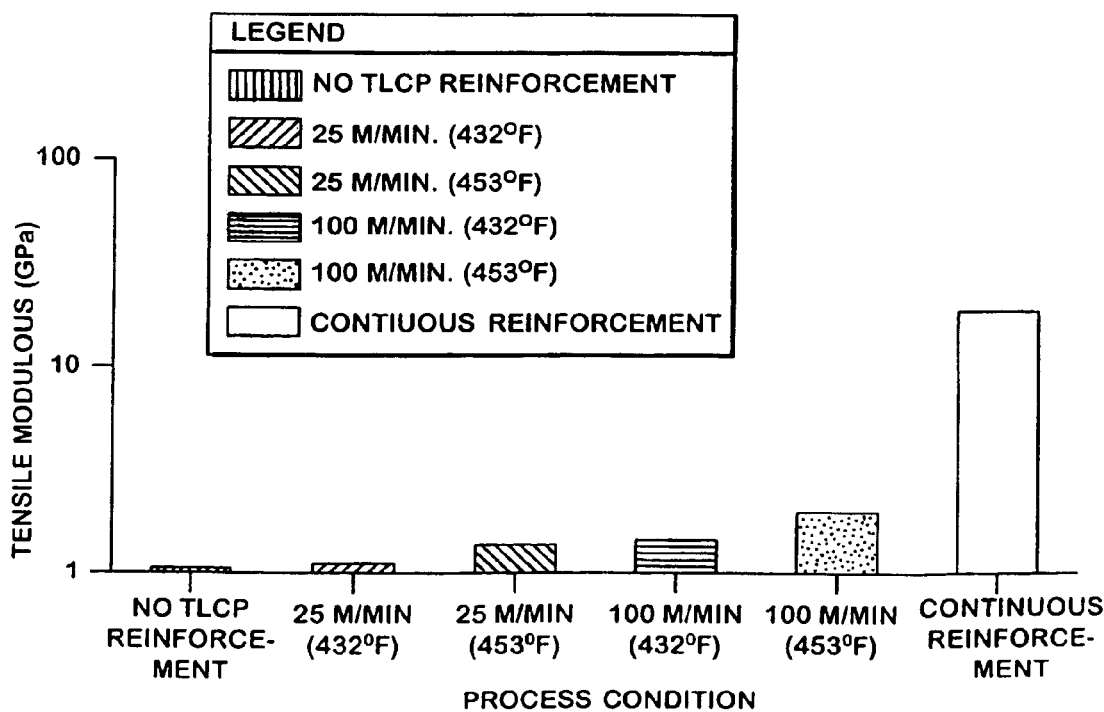
FIG. 8, which is a graphical illustration of the effects of different process conditions on the modulus of buffer tubes produced using a two-step procedure where the composite melt stream is pelletized and later processed using conventional extrusion technology.

Those skilled in the art will now recognize that it is generally favorable to process the composite melt so as to obtain continuous TLCP fibrils since the continuity results in a greater increase in modulus and decrease in CTE, as evidenced by the comparison illustration in FIG. 8. However, the processing of the composite containing TLCP via pelletization to form discontinuous filaments may also be advantageous since the resulting pellets are easily processed using ordinary extrusion techniques, and the resulting TLCP fibrils may be subjected to additional orientation or rearrangement during secondary processing if they are exposed to a high degree of extensional flow.

A composite buffer tube for an optical fiber cable was produced via the co-extrusion process described above. The buffer tube so produced comprised a thermoplastic matrix having about 20 weight percent continuous thermotropic liquid crystalline polymer reinforcements dispersed therein. The TLCP reinforcements in the resulting product were characterized as having a high aspect ratio (length to diameter ratio) on the order of about 10 to 1 and a mean diameter of under about 100 $\mu$m. The TLCP material used as reinforcement was an aromatic polyester, such as HX-8000™ produced by DuPont. Other aromatic polyesters that may be used as the TLCP material include: Zenite 6000,™ and Zenite 7000™ LCP resins produced by DuPont; LC 3000™ produced by Unitca; and Vectra™ LCP resins produced by Hoechst Celanese. The material used for the thermoplastic matrix material was a nucleated polypropylene-ethylene copolymer composition having between about 2 to 30 weight percent ethylene units in the chemical structure. This matrix material also included approximately 0.05 to 1.0 weight percent of a nucleating agent such as sodium benzoate to increase the rate of crystallization or crystallinity or to enhance optical clarity.

The composite material described above was extruded into buffer tubes with a Maileffer 45 mm single screw extruder, an Nokia-Maileffer model 4/6 crosshead using a screen pack of 20/40/80 mesh, and a screw having double flights in its feed section, double barriers in its metering section, a length to diameter ratio of 20 to 1 and a compression ratio up to 2 to 1. The composite buffer tubes were extruded extrusion with the above described apparatus according to the processing and tooling parameters set forth in Table 1.

TABLE 1

| | |
|---|---|
| Line Speed | 30.1 meters/min |
| Die/Trough Distance | 7.5" |
| Melt Temp. | 419° F. |
| Screw Speed | 22.0 rpm |
| Gel Output | 34.0 rpm |
| Gel Temp. | 123° F. |
| 1st Trough Temp. | 48.2° F. |
| 2nd Trough Temp. | 64.0° F. |
| Tube Outside Diameter (OD) | 0.120" |
| Tube Inside Diameter (ID) | 0.081" |
| Tube Wall Thickness | 0.020" |
| Die ID | 0.270" |
| Tip OD | 0.180" |
| Tip ID | 0.140" |
| Gel Needle (OD × ID) | 0.100" × 0.120" |
| Hot Water Temp. | Ice water |
| Cold Water Temp. | Ice water |
| Resin Drying Temp. | 130° F. for more than 4 hours |
| Extruder Temp. Profile | 185/195/200/212/240/240° C. |

Experiments were run to determine the effects of melt temperature and process line speeds on the tensile modulus of the resulting buffer tubes. FIG. 8 illustrates that as line speeds and melt temperature are increased, the tensile modulus also increases. FIG. 8 also illustrates the difference in tensile modulus between a buffer tube having no TLCP reinforcement and one that has been reinforced with substantially continuous TLCP fibrils (Continuous Reinforcement).

The present invention overcomes many of the difficulties of the prior art by producing a homogeneous composite melt stream. Unlike conventional co-extrusion technology where a stream of the TLCP melt is combined directly with a stream of the thermoplastic, the method described above decreases the diameter of the TLCP phase melt stream within the thermoplastic matrix and provides better heat transfer. The improvement in heat transfer can prevent degradation of the thermoplastic melt caused by overheating and can lead to better control of final product dimensions and microstructure. Additionally, by dividing the TLCP phase into very small diameter fibrils, it is easier to induce an extensional flow in the TLCP phase which results in the TLCP fibrils laying substantially in the longitudinal or axial direction. By controlling both heat transfer and extensional flow as described above, it is possible to generate optimal properties in the TLCP phase of the composite, thereby allowing the manufacture of a optical fiber cable structural component having a high modulus and low CTE while minimizing the amount of TLCP incorporated into the thermoplastic matrix. Minimizing the amount of TLCP is important since the cost of the TLCP material is typically several times that of many conventional thermoplastic matrix materials used for structural components of optical fiber cables.

Also, the use of composite materials in optical fiber telecommunications cables, as described herein, offers several design and product advantages. First, the modulus of the TLCP phase in thermoplastic matrix cable components produced by the aforementioned process can be dramatically increased relative to components made of conventional thermoplastic materials. At the same time, the CTE of components made according to the present invention will be reduced. An increase in modulus in one or more cable structural components can lead to reduction in the use of reinforcing yarns or other reinforcing members and lead to an overall manufacturing and materials cost savings. Additionally by reducing the CTE, the fiber window in the cable design can be reduced and a smaller cable diameter can be designed for the same fiber count.

Because the TLCP reinforcements can be added during extrusion processing, the present invention provides processing advantages over the prior art. More particularly, cable manufacturing processing steps can be eliminated because the reinforcing structures can be extruded directly into cable components, such as buffer tubes, jackets, rod-like reinforcements and filler rods, rather than added to the cable in separate manufacturing steps. The method of the present invention, described above, also allows the possibility of producing a cable in one continuous process where fiber and waterblocking gels, tapes, yarns, or powders are encapsulated by a co-extruded protective composite structure containing reinforcement, as illustrated in FIG. 4. The elimination of process steps and, thereby, layers in cable construction allows for easier on-site access to the fibers within a cable during splicing operations as well as reduced production costs.

Alternatively, an extruded optical fiber cable component, such as a buffer tube, can be made according to the method described above using a polyester, such as poly butylene terepthalate (PBT), a polyamide, such as nylon 6, nylon 6—6 or nylon 12, or a polyethylene homopolymer thermoplastic matrix injected with the TLCP material. The polyethylene homopolymer can be a high density polyethylene, medium density polyethylene, low density polyethylene, a linear low density polyethylene, or some combination thereof. Alternatively, the matrix material may comprise a terpolymer of propylene, ethylene, and at least one olefinic monomer.

Approximately 0.05 to 1.0 weight percent of a nucleating agent such as sodium succinate, sodium gluterate, sodium caproate, sodium benzoate, sodium stearate and potassium benzoate may be added to polyolefin thermoplastic matrix materials to increase the rate of crystallization or crystallinity of the matrix material as well as to enhance optical clarity. Other chemical additives such as ultraviolet or thermal stabilizers may also included in the composition. Additionally, 0–40% filler, such as talc, calcium carbonate, carbon black, mica, silica, glass, kaolin, or mixtures thereof, may be dispersed within the matrix. A detailed discussion of the incorporation of nucleating agents and fillers in polyolefin materials to make buffer tubes for optical fiber cables may be found in U.S. Pat. No. 5,574,816, which is incorporated herein by reference.

It can be seen from the foregoing disclosure and series of examples that the present invention offers a method of production of fiber optic cable components which offers substantial advantages over the prior art. The embodiments disclosed herein achieve the object of the invention; however, it should be appreciated by those skilled in the art that departures can be made from the following claims without parting from the spirit and scope of the invention.

What is claimed is:

1. A method for producing an optical fiber cable composite structural component, the composite comprising a thermoplastic polymer matrix containing a thermotropic liquid crystalline polymer dispersed therein, the method comprising the steps of:

providing a thermoplastic polymer matrix melt stream;

providing a thermotropic liquid crystalline polymer melt stream;

dividing the thermotropic liquid crystalline polymer melt stream into a plurality of thermotropic liquid crystalline melt streams;

injecting the plurality of thermotropic liquid crystalline polymer melt streams into the thermoplastic polymer matrix melt stream to form a composite melt stream comprising a thermoplastic polymer matrix melt stream containing a plurality of thermotropic liquid crystalline polymer melt streams dispersed therein;

passing said composite melt stream through a static mixer to subdivide and draw down the individual liquid crystalline polymer melt streams;

extruding the composite melt stream through a die to form the optical fiber cable composite structural component.

2. The method described in claim 1, wherein the composite melt stream is cooled, and pelletized, and the resulting cooled, and pelletized material, and the resulting cooled and pelletized material is extruded into the structural component.

3. The method described in claim 1, wherein the structural component is extruded through the die at a rate in the range of about 25 to 100 meters per minute in a temperature range of about 222 to 234° C.

4. The method described in claim 1, wherein the structural component is extruded through the die at a rate of at least about 50 meters per minute in a temperature range of about 222 to 234° C.

* * * * *